US011305392B1

(12) United States Patent
Flynn

(10) Patent No.: US 11,305,392 B1
(45) Date of Patent: Apr. 19, 2022

(54) HOLE SAW DUST COLLECTION DEVICE

(71) Applicant: Jeremiah Flynn, Ringwood, NJ (US)

(72) Inventor: Jeremiah Flynn, Ringwood, NJ (US)

( * ) Notice: Subject to any disclaimer, the term of this patent is extended or adjusted under 35 U.S.C. 154(b) by 183 days.

(21) Appl. No.: 16/708,601

(22) Filed: Dec. 10, 2019

(51) Int. Cl.
*B23Q 11/00* (2006.01)

(52) U.S. Cl.
CPC ...... *B23Q 11/0071* (2013.01); *B23Q 11/0046* (2013.01)

(58) Field of Classification Search
CPC ............ B23Q 11/0046; B23Q 11/0071; B23D 49/003; B23D 49/11; B23D 49/16; B23D 51/16; B23D 61/006; B23D 45/165; B27D 19/008; B27D 47/126
See application file for complete search history.

(56) References Cited

U.S. PATENT DOCUMENTS

| | | | |
|---|---|---|---|
| 4,876,789 A * | 10/1989 | Burwell | B23D 49/003 29/560 |
| 5,292,210 A | 3/1994 | Nowick | |
| 5,688,082 A | 11/1997 | Richardson | |
| 5,797,189 A * | 8/1998 | Gilbert | B23D 49/003 144/363 |
| D575,311 S | 8/2008 | Konecny | |
| 10,005,163 B2 | 6/2018 | Johnson | |
| 2004/0141820 A1 | 7/2004 | Mikon | |
| 2006/0147284 A1 | 7/2006 | Kim | |
| 2007/0264092 A1 | 11/2007 | Kesten | |
| 2017/0001252 A1 * | 1/2017 | Caroprese | B23D 49/003 |
| 2018/0043490 A1 * | 2/2018 | Johnson | A47L 7/0095 |
| 2021/0197300 A1 * | 7/2021 | Sebhatu | B23D 61/006 |

FOREIGN PATENT DOCUMENTS

WO 9520440 8/1995

OTHER PUBLICATIONS

WWW.Quadsaw.com, Sebhatu (Year: 2017).*

* cited by examiner

*Primary Examiner* — Anna K Kinsaul
*Assistant Examiner* — Daniel Jeremy Leeds

(57) ABSTRACT

The hole saw dust collection device comprises a dust cover, an inner hole cutter, an outer hole cutter, a plurality of motion transfer rollers, and a hand crank handle. The hole saw dust collection device may saw a rectangular hole in a target surface using the outer hole cutter. The outer hole cutter may be directed along a rectangular path inside of the dust cover by a plurality of outer rollers. Rotation of the inner hole cutter may be transferred to the outer hole cutter via contact between the inner hole cutter, a plurality of inner rollers, the plurality of outer rollers, and the outer hole cutter. Saw dust produced by cutting the target surface may be suctioned from the interior of the dust cover by a vacuum cleaner that is coupled to the dust cover.

13 Claims, 4 Drawing Sheets

HOLE SAW DUST COLLECTION DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of construction tools, more specifically, a hole saw dust collection device.

SUMMARY OF INVENTION

The hole saw dust collection device comprises a dust cover, an inner hole cutter, an outer hole cutter, a plurality of motion transfer rollers, and a hand crank handle. The hole saw dust collection device may saw a rectangular hole in a target surface using the outer hole cutter. The outer hole cutter may be directed along a rectangular path inside of the dust cover by a plurality of outer rollers. Rotation of the inner hole cutter may be transferred to the outer hole cutter via contact between the inner hole cutter, a plurality of inner rollers, the plurality of outer rollers, and the outer hole cutter. Saw dust produced by cutting the target surface may be suctioned from the interior of the dust cover by a vacuum cleaner that is coupled to the dust cover.

An object of the invention is to cut a rectangular hole in a target surface.

Another object of the invention is to collect dust producing while cutting using a vacuum cleaner.

A further object of the invention is to drive rotation of the blade using either a rotary tool or a hand crank handle.

Yet another object of the invention is to provide a spirit level to assist in aligning the hole.

These together with additional objects, features and advantages of the hole saw dust collection device will be readily apparent to those of ordinary skill in the art upon reading the following detailed description of the presently preferred, but nonetheless illustrative, embodiments when taken in conjunction with the accompanying drawings.

In this respect, before explaining the current embodiments of the hole saw dust collection device in detail, it is to be understood that the hole saw dust collection device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the hole saw dust collection device.

It is therefore important that the claims be regarded as including such equivalent construction insofar as they do not depart from the spirit and scope of the hole saw dust collection device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
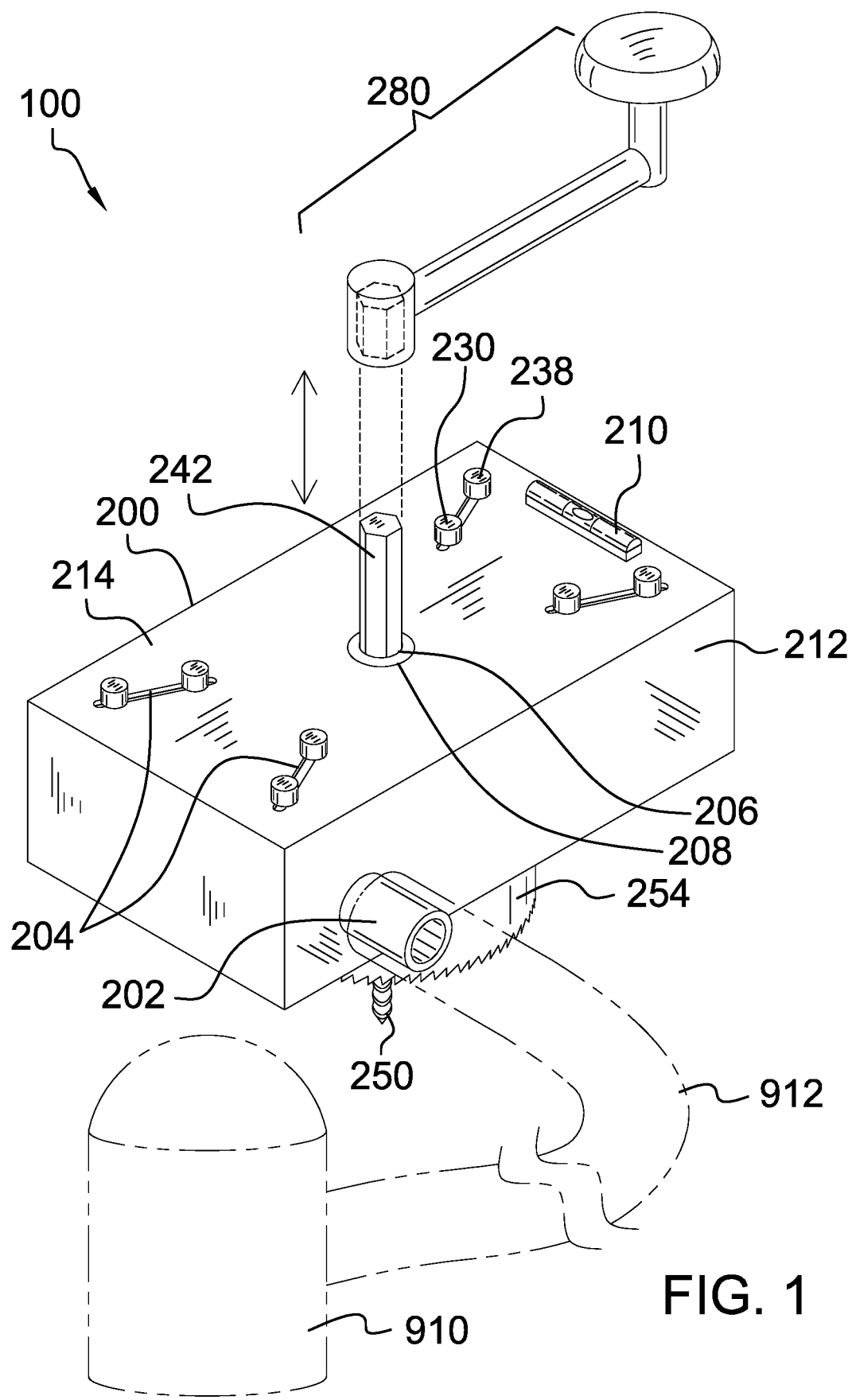
FIG. 1 is a front isometric view of an embodiment of the disclosure illustrating the placement of the hand crank handle.
Figure 2:
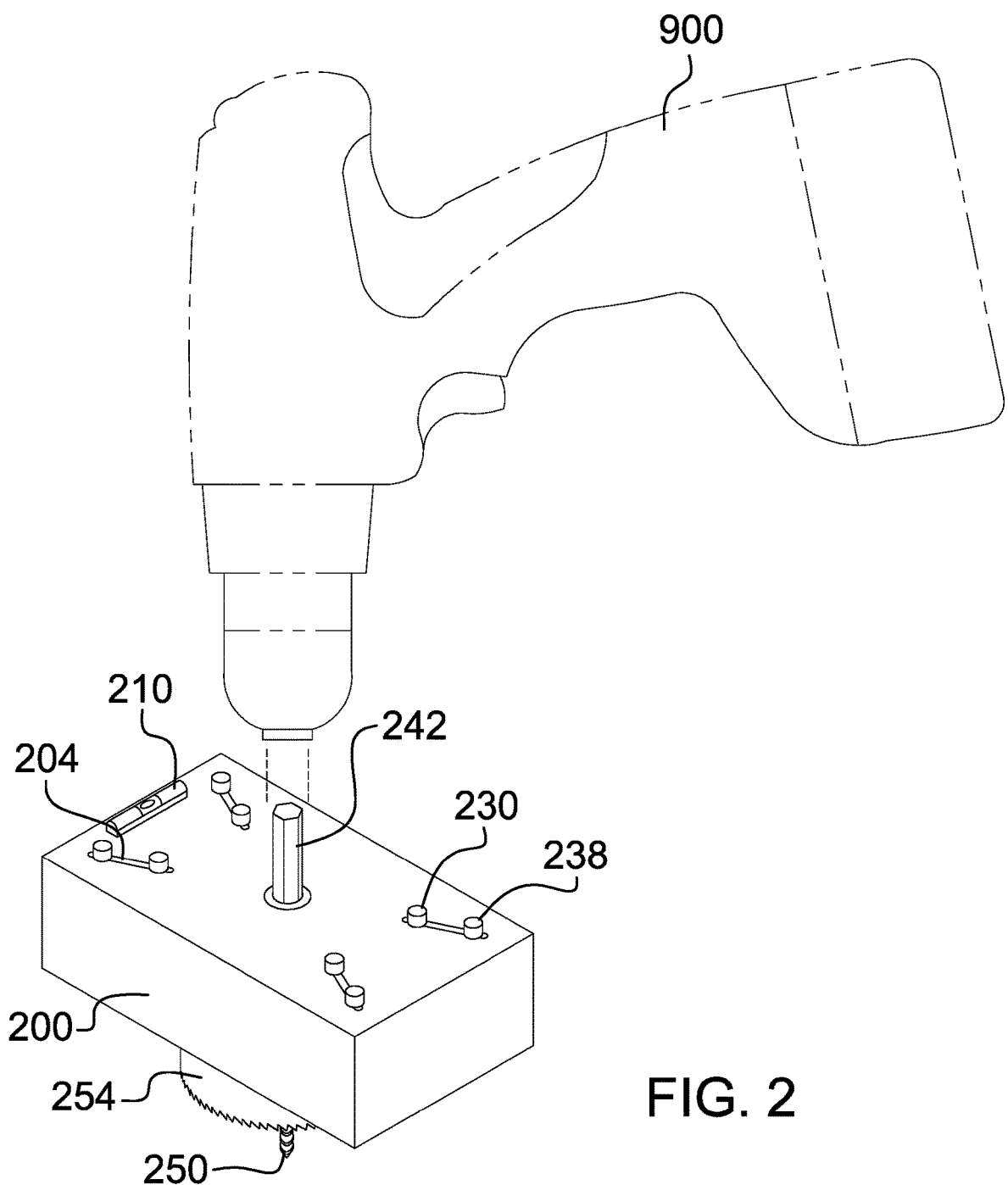
FIG. 2 is a rear isometric view of an embodiment of the disclosure illustrating the placement of a rotary tool.
Figure 3:
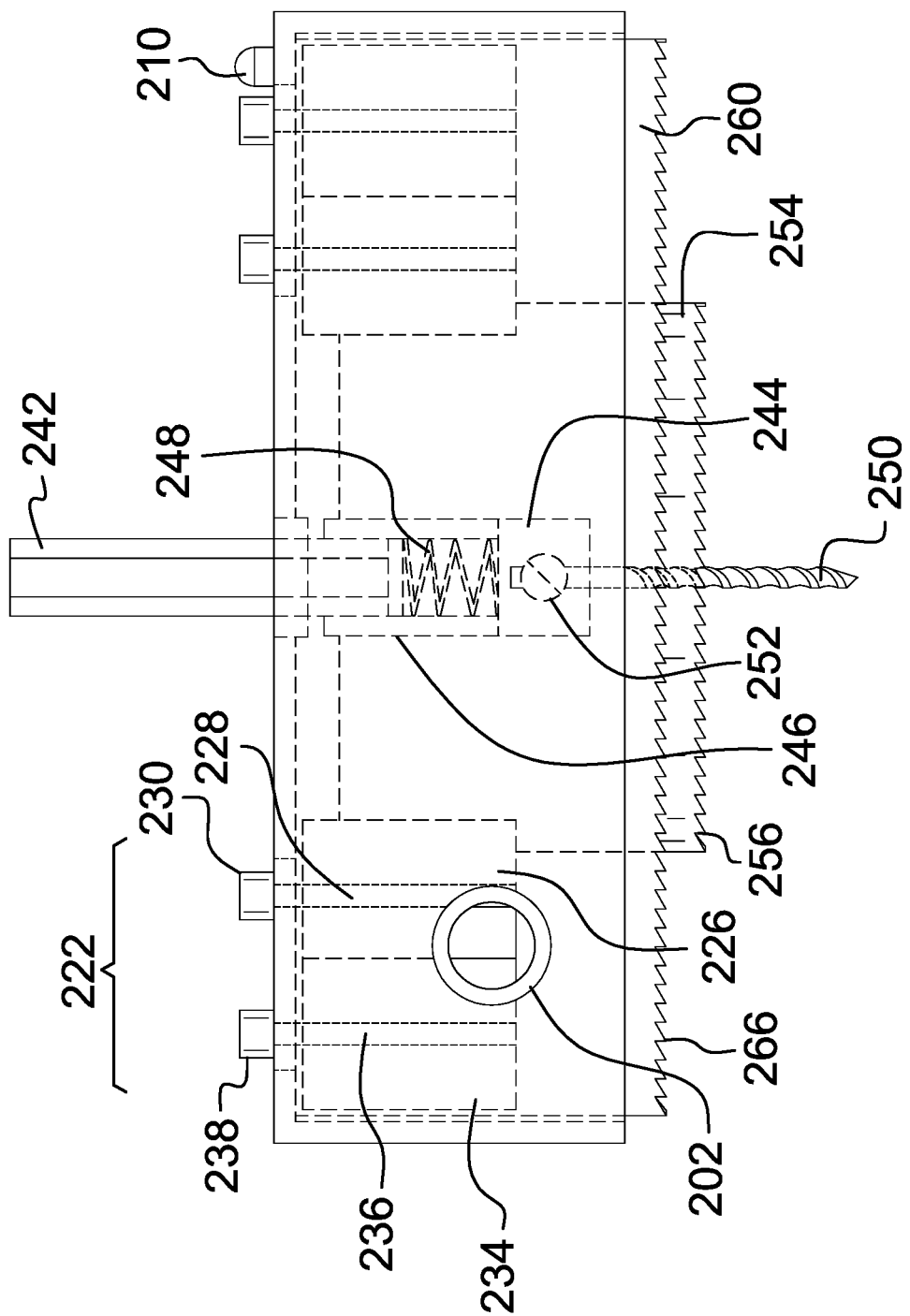
FIG. 3 is a front view of an embodiment of the disclosure.
Figure 4:
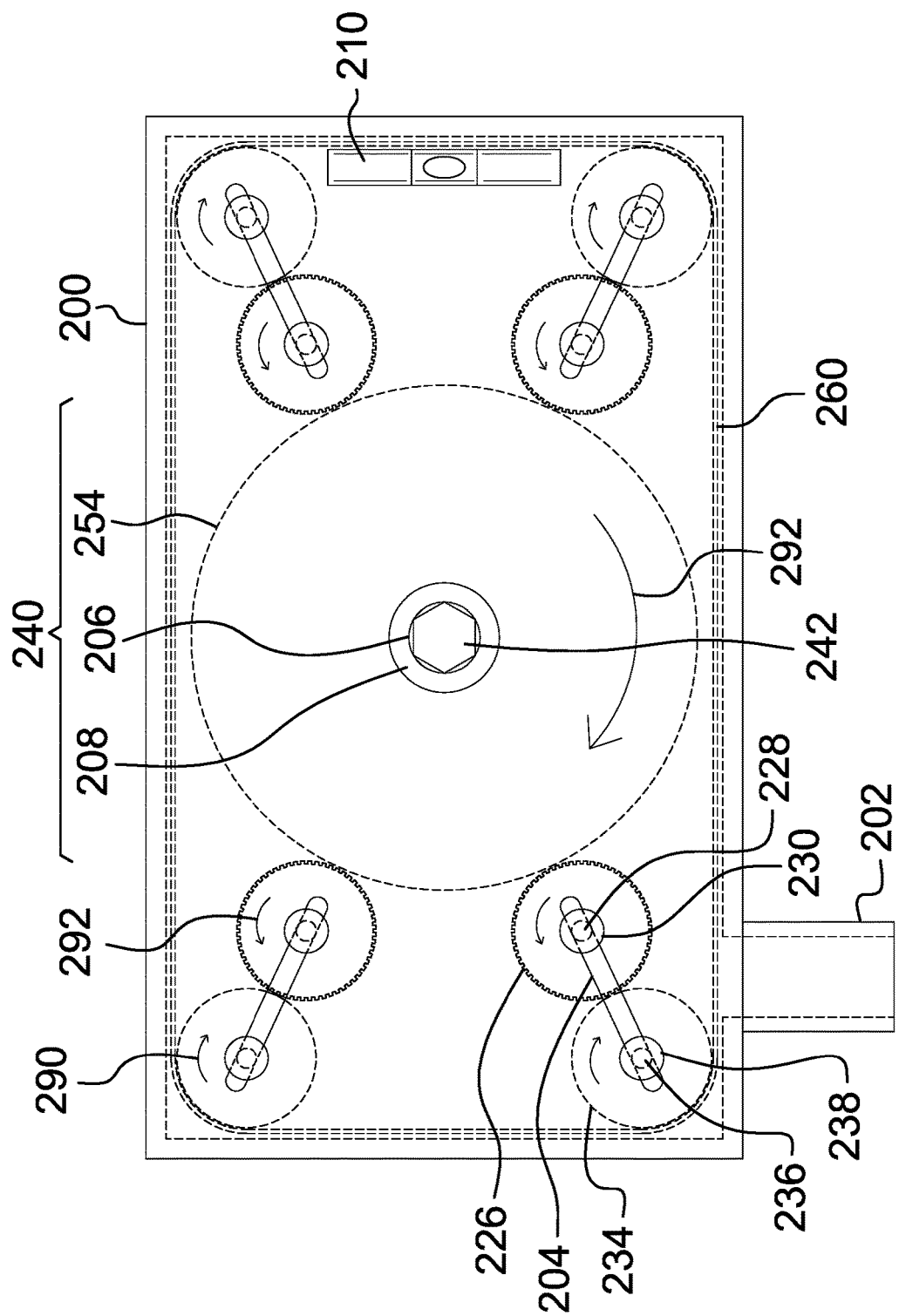
FIG. 4 is a top view of an embodiment of the disclosure.

Detailed reference will now be made to a first potential embodiment of the disclosure, which is illustrated in FIGS. 1 through 4.

The hole saw dust collection device 100 (hereinafter invention) comprises a dust cover 200, an inner hole cutter 240, an outer hole cutter 260, a plurality of motion transfer rollers, and a hand crank handle 280. The invention 100 may saw a rectangular hole in a target surface using the outer hole cutter 260. The outer hole cutter 260 may be directed along a rectangular path inside of the dust cover 200 by a plurality of outer rollers. Rotation of the inner hole cutter 240 may be transferred to the outer hole cutter 260 via a plurality of inner rollers in contact with the inner hole cutter 240, the plurality of outer rollers in contact with the plurality of inner rollers, and the outer hole cutter 260 in contact with the plurality of outer rollers. Saw dust produced by cutting the target surface may be confined within the dust cover 200 and may be suctioned from the interior of the dust cover 200 by a vacuum cleaner 910 that is coupled to a dust port 202 of the dust cover 200 via a vacuum hose 912. As non-limiting examples, the target surface may be drywall, wood, cement board, plastic, or sheet metal.

Note that although the invention 100 is described and illustrated in the orientation shown in FIGS. 1 through 4 as though a hole saw blade 254 is cutting downwards into the target surface, the orientation of the invention 100 may be change to cut in any direction.

The dust cover 200 may comprise one or more side walls 212 and a top wall 214. The one or more side walls 212 may be sides of the dust cover 200 that surround a circular hole and may prevent the saw dust from exiting the dust cover 200 laterally. The top wall 214 may be a top of the dust cover 200. The top wall 214 may be coupled to the top of the one or more side walls 212. The top wall 214 may prevent the saw dust from exiting the dust cover 200 vertically. The dust cover 200 may comprise the dust port 202, a bit aperture 206, a plurality of roller adjustment apertures 204, and a spirit level 210.

The dust port 202 may be an aperture in the one or more side walls 212 of the dust cover 200. The dust port 202 may be surrounded by a rigid tube such that the vacuum hose 912 from the vacuum cleaner 910 may be removably coupled to the dust port 202. Operation of the vacuum cleaner 910 while the vacuum hose 912 is coupled to the dust port 202 may suction the interior of the dust cover 200 and may remove the saw dust created by cutting into the target surface.

The bit aperture 206 may be an aperture located at the center of the top wall 214 such that a hex shank 242 of the inner hole cutter 240 may pass through the bit aperture 206 to exit the dust cover 200. The bit aperture 206 may comprise a bit bushing 208 to reduce friction between the hex shank 242 and the top wall 214 of the dust cover 200.

The plurality of roller adjustment apertures 204 may be a plurality of slotted apertures located in the top wall 214 of the dust cover 200. The plurality of roller adjustment apertures 204 may be oriented to align with radials emanating from the center of the bit aperture 206 and extending laterally across the top wall 214 of the dust cover 200. The plurality of motion transfer rollers may be radially repositionable within the plurality of roller adjustment apertures 204 in order to adjust the tension of the outer hole cutter 260.

The spirit level 210 may be an instrument that indicates whether or not the dust cover 200 is level. The spirit level 210 may be used to orient the rectangular hole.

The inner hole cutter 240 may comprise an arbor 244, the hole saw blade 254, a pilot bit 250, and the hex shank 242. Rotation of the inner hole cutter 240 may cut the circular hole using a first kerf 256 of the hole saw blade 254. Rotation of the inner hole cutter 240 may also transfer motion from the hole saw blade 254 to the outer hole cutter 260 by rotating the plurality of inner rollers and the plurality of outer rollers.

The arbor 244 may be a mandrel that couples to the hex shank 242, the hole saw blade 254, and the pilot bit 250. The hex shank 242 may slidably couple to a collar 246 of the arbor 244. A spring 248 located within the collar 246 may permit the inner hole cutter 240 to compress as the inner hole cutter 240 is pressed against the target surface.

The hole saw blade 254 may be a cylindrical saw blade comprising the first kerf 256 on the bottom edge such that the hole saw blade 254 cuts the circular hole as the hole saw blade 254 is rotated and pressed downwards.

The pilot bit 250 may removably couple to the bottom of the arbor 244 and may extend vertically downward. The pilot bit 250 may be held in place at the bottom of the arbor 244 by a set screw 252. During use, the pilot bit 250 may contact the target surface first and may drill a pilot hole into the target surface prior to the hole saw blade 254 making contact with the target surface.

A rotary tool 900 may be detachably coupled to the hex shank 242. The rotary tool 900 may be operable to apply an external rotational force to the hex shank 242 when the rotary tool 900 is energized. The external rotational force may turn the inner hole cutter 240 in a first rotational direction 290.

The outer hole cutter 260 may be a continuous, flexible saw blade. The bottom edge of the outer hole cutter 260 may comprise a second kerf 266. The outer hole cutter 260 may wrap around the plurality of outer rollers to follow the rectangular path. The outer hole cutter 260 may be set in motion by turning the plurality of outer rollers in the first rotational direction 290 such that the outer hole cutter 260 follows the rectangular path and cuts the rectangular hole using the second kerf 266.

The plurality of motion transfer rollers may comprise pairs of rollers disposed at the corners of the dust cover 200. An individual pair of motion transfer rollers 222 selected from the plurality of motion transfer rollers may be associated with each of the plurality of roller adjustment apertures 204. The plurality of motion transfer rollers may transfer motion of the inner hole cutter 240 to the outer hole cutter 260 and may determine the rectangular path for the outer hole cutter 260.

The individual pair of motion transfer rollers 222 may comprise an inner motion transfer roller and an outer motion transfer roller. The outer motion transfer roller may guide the outer hole cutter 260 and may move the outer hole cutter 260. The inner motion transfer roller may transfer motion of the hole saw blade 254 to the outer motion transfer roller.

The inner motion transfer roller may comprise an inner roller 226, an inner roller axle 228, and an inner roller knob 230. The inner roller 226 may be pivotably coupled to the inner roller axle 228. The inner roller 226 may be located within the dust cover 200. The inner roller axle 228 may pass upwards through one of the plurality of roller adjustment apertures 204 and may be held in place by the inner roller knob 230. The inner roller 226 may be repositioned by loosening the inner roller knob 230, moving the inner roller axle 228 radially towards or away from the bit aperture 206, and tightening the inner roller knob 230. The inner roller 226 may be positioned to press against the hole saw blade 254 such that when the hole saw blade 254 turns in the first rotational direction 290 then the inner roller 226 may turn in a second rotational direction 292. In some embodiments, the inner motion transfer roller may be grooved to increase friction between the hole saw blade 254 and the inner roller 226, between the inner roller 226 and a set wheel roller 234, or both.

The outer motion transfer roller may comprise the set wheel roller 234, a set wheel axle 236, and a set wheel knob 238. The set wheel roller 234 may be pivotably coupled to the set wheel axle 236. The set wheel roller 234 may be located within the dust cover 200. The set wheel axle 236 may pass upwards through one of the plurality of roller adjustment apertures 204 and may be held in place by the set wheel knob 238. The set wheel roller 234 may be repositioned by loosening the set wheel knob 238, moving the set wheel axle 236 radially towards or away from the bit aperture 206, and tightening the set wheel knob 238. The set wheel roller 234 may be positioned to press against the inner motion transfer roller such that when the inner motion transfer roller turns in the second rotational direction 292 then the set wheel roller 234 may turn in the first rotational direction 290. The set wheel roller 234 may contact the outer hole cutter 260 such that rotation of the set wheel roller 234 in the first rotational direction 290 forces motion of the outer hole cutter 260 in the first rotational direction 290.

The hand crank handle 280 may be detachably coupled to the hex shank 242 of the inner hole cutter 240. The hand crank handle 280 may be operable to apply the external rotational force to the hex shank 242 of the inner hole cutter 240.

In use, the vacuum hose 912 may be coupled to the dust port 202, the rotary tool 900 may be coupled to the top of the hex shank 242, and the vacuum cleaner 910 may be turned on. The pilot bit 250 may be placed at the center of the area where the rectangular hole is desired and the rotary tool 900 may be energized to start drilling the pilot hole. As the rotary tool 900 is pushed towards the target surface, the pilot bit 250 may sink into the target surface until the inner hole cutter 240 contacts the target surface and begins to cut the circular hole. In addition, the spring 248 may compress, allowing the dust cover 200 to move towards the target surface and to contact the target surface. Suction provided by the vacuum cleaner 910 via the vacuum hose 912 may remove the saw dust created by the cutting.

As the inner hole cutter 240 cuts deeper into the target surface, the outer hole cutter 260 may move closer to the target surface. The outer hole cutter 260 may be in motion due to rotation of the inner hole cutter 240 transferred to the outer hole cutter 260 via the plurality of motion transfer rollers. The outer hole cutter 260 may eventually begin to cut the rectangular hole. When the outer hole cutter 260 has completed cutting the rectangular hole, the invention 100 may be withdrawn from the rectangular hole.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used herein, "align" refers to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an "aperture" is an opening in a surface. Aperture may be synonymous with hole, slit, crack, gap, slot, or opening.

As used herein, "arbor" refers to the shaft, spindle, or mandrel which a saw blade mounts to.

As used in this disclosure, an "axle" is a cylindrical shaft that is inserted through the center of an object such that the center axis of the object and the center axis of the axle are aligned and the object can rotate using the axle as an axis of rotation.

As used in this disclosure, a "bushing" is a cylindrical aperture through which an object is guided and potentially secured. Bushings are sometimes used as protective linings to reduce friction and to provide a leak-proof seal.

As used in this disclosure, a "collar" is a ring like device that is placed around an object.

In this disclosure, "compress" refers to forcing into a smaller space.

As used herein, the words "couple", "couples", "coupled" or "coupling", refer to connecting, either directly or indirectly, and does not necessarily imply a mechanical connection.

As used in this disclosure, a "crank" is a handle or an arm that is attached perpendicularly to the axis of rotation of a shaft and that is used for transmitting rotary motion to the shaft.

As used herein, the word "desired" refers to a specific value or action within a range of supported values or action. A "desired" value or action indicates that a range of values or actions is enabled by the invention and that a user of the invention may select a specific value or action within the supported range of values or action based upon their own personal preference. As a non-limiting example, for a fan that supports operational speed settings of low, medium, or high, a user may select a desired fan speed, meaning that the user may select low, medium, or high speed based upon their needs and preferences at the time of the selection.

As used in this disclosure, "flexible" refers to an object or material which will deform when a force is applied to it, which will not return to its original shape when the deforming force is removed, and which may not retain the deformed shape caused by the deforming force.

As used in this disclosure, a "handle" is an object by which a tool, object, or door is held or manipulated with the hand.

As used in this disclosure, the word "interior" is used as a relational term that implies that an object is located or contained within the boundary of a structure or a space.

As used in this disclosure, the word "lateral" refers to the sides of an object or movement towards a side. Lateral directions are generally perpendicular to longitudinal directions. "Laterally" refers to movement in a lateral direction.

As used in this disclosure, "orientation" refers to the positioning and/or angular alignment of a first object relative to a second object or relative to a reference position or reference direction.

As used herein, "rigid" refers to an object or material which is inflexible. If a force is applied to a rigid object the rigid object does not bend or deform unless the force applied reaches the breaking point of the rigid object.

As used herein, a "spirit level" or "bubble level" is an instrument that indicates whether a surface being tested is horizontal (level) or vertical (plumb). The level works on the principle that a liquid may incompletely fill a transparent container that comprises a curvature and that the bubble created by the incomplete filling will float to the center of the container when the container is horizontal. The level may comprise markings to make it clear that the bubble is at the center of the container. Even though centering of the bubble within the container relies upon a horizontal orientation of the container, vertical (plumb) measurements may be made if the container is mounted on a base that comprises a right angle with the container on a horizontal surface of the base and a vertical surface of the base pressed against the surface being tested.

As used in this disclosure, a "spring" is a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used herein, "vacuum cleaner" refers to a device that uses suction to collect dust and small particles from a floor or other surface. In some embodiments, a vacuum cleaner may provide a hose and one or more hose attachments to contact the surface that is being vacuumed.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A hole saw dust collection device comprising:
a dust cover, an inner hole cutter, an outer hole cutter, a plurality of motion transfer rollers, and a hand crank handle;
wherein the hole saw dust collection device saws a rectangular hole in a target surface using the outer hole cutter;
wherein the outer hole cutter is directed along a rectangular path inside of the dust cover by a plurality of outer rollers;
wherein rotation of the inner hole cutter is transferred to the outer hole cutter via a plurality of inner rollers in contact with the inner hole cutter, the plurality of outer rollers in contact with the plurality of inner rollers, and the outer hole cutter in contact with the plurality of outer rollers;
wherein saw dust produced by cutting the target surface is confined within the dust cover and is suctioned from the interior of the dust cover by a vacuum cleaner that is coupled to a dust port of the dust cover via a vacuum hose;
wherein the plurality of roller adjustment apertures are a plurality of slotted apertures located in the top wall of the dust cover;
wherein the plurality of roller adjustment apertures are oriented to align with radials emanating from the center of the bit aperture;
wherein the dust cover comprises one or more side walls and a top wall;
wherein the one or more side walls are sides of the dust cover that surround a circular hole and prevent the saw dust from exiting the dust cover laterally;
wherein the top wall is a top of the dust cover;
wherein the top wall is coupled to the top of the one or more side walls;
wherein the top wall prevents the saw dust from exiting the dust cover vertically;
wherein the dust cover comprises the dust port, a bit aperture, a plurality of roller adjustment apertures, and a spirit level;
wherein the dust port is an aperture in the one or more side walls of the dust cover;
wherein the dust port is surrounded by a rigid tube such that the vacuum hose from the vacuum cleaner removably couples to the dust port;
wherein operation of the vacuum cleaner while the vacuum hose is coupled to the dust port suctions the interior of the dust cover and removes the saw dust created by cutting into the target surface;
wherein the bit aperture is an aperture located at the center of the top wall such that a hex shank of the inner hole cutter passes through the bit aperture to exit the dust cover;
wherein the bit aperture comprises a bit bushing to reduce friction between the hex shank and the top wall of the dust cover;
wherein the spirit level is an instrument that indicates whether the dust cover is level;
wherein the spirit level is used to orient the rectangular hole;
wherein the inner hole cutter comprises an arbor, a hole saw blade, a pilot bit, and the hex shank;
wherein rotation of the inner hole cutter cuts the circular hole using a first kerf of the hole saw blade;
wherein rotation of the inner hole cutter transfers motion from the hole saw blade to the outer hole cutter by rotating the plurality of inner rollers and the plurality of outer rollers.

2. The hole saw dust collection device according to claim 1
wherein the arbor is a mandrel that couples to the hex shank, the hole saw blade, and the pilot bit;
wherein the hex shank slidably couples to a collar of the arbor;
wherein a spring located within the collar permits the inner hole cutter to compress as the inner hole cutter is pressed against the target surface.

3. The hole saw dust collection device according to claim 2
wherein the hole saw blade is a cylindrical saw blade comprising the first kerf on the bottom edge such that the hole saw blade cuts the circular hole as the hole saw blade is rotated and pressed downwards.

4. The hole saw dust collection device according to claim 3
wherein the pilot bit removably couples to the bottom of the arbor and extends vertically downward;
wherein the pilot bit is held in place at the bottom of the arbor by a set screw;
wherein during use, the pilot bit contacts the target surface first and drills a pilot hole into the target surface prior to the hole saw blade making contact with the target surface.

5. The hole saw dust collection device according to claim 4
wherein a rotary tool is detachably coupled to the hex shank;
wherein the rotary tool is operable to apply an external rotational force to the hex shank when the rotary tool is energized;
wherein the external rotational force turns the inner hole cutter in a first rotational direction.

6. The hole saw dust collection device according to claim 4
wherein the outer hole cutter is a continuous, flexible saw blade;
wherein the bottom edge of the outer hole cutter comprises a second kerf;

wherein the outer hole cutter wraps around the plurality of outer rollers to follow the rectangular path;

wherein the outer hole cutter is set in motion by turning the plurality of outer rollers in the first rotational direction such that the outer hole cutter follows the rectangular path and cuts the rectangular hole using the second kerf.

7. The hole saw dust collection device according to claim 6 wherein the plurality of motion transfer rollers comprise pairs of rollers disposed at the corners of the dust cover;

wherein an individual pair of motion transfer rollers selected from the plurality of motion transfer rollers is associated with each of the plurality of roller adjustment apertures;

wherein the plurality of motion transfer rollers transfer motion of the inner hole cutter to the outer hole cutter and determine the rectangular path for the outer hole cutter.

8. The hole saw dust collection device according to claim 7 wherein the individual pair of motion transfer rollers comprises an inner motion transfer roller and an outer motion transfer roller;

wherein the outer motion transfer roller guides the outer hole cutter and moves the outer hole cutter;

wherein the inner motion transfer roller transfers motion of the hole saw blade to the outer motion transfer roller.

9. The hole saw dust collection device according to claim 8 wherein the inner motion transfer roller comprises an inner roller, an inner roller axle, and an inner roller knob;

wherein the inner roller is pivotably coupled to the inner roller axle;

wherein the inner roller is located within the dust cover;

wherein the inner roller axle passes upwards through one of the plurality of roller adjustment apertures and is held in place by the inner roller knob;

wherein the inner roller is repositioned by loosening the inner roller knob, moving the inner roller axle radially towards or away from the bit aperture, and tightening the inner roller knob;

wherein the inner roller is positioned to press against the hole saw blade such that when the hole saw blade turns in the first rotational direction then the inner roller turns in a second rotational direction.

10. The hole saw dust collection device according to claim 9 wherein the inner motion transfer roller is grooved to increase friction between the hole saw blade and the inner roller, between the inner roller and a set wheel roller, or both.

11. The hole saw dust collection device according to claim 10 wherein the outer motion transfer roller comprises the set wheel roller, a set wheel axle, and a set wheel knob;

wherein the set wheel roller is pivotably coupled to the set wheel axle;

wherein the set wheel roller is located within the dust cover;

wherein the set wheel axle passes upwards through one of the plurality of roller adjustment apertures and is held in place by the set wheel knob;

wherein the set wheel roller is repositioned by loosening the set wheel knob, moving the set wheel axle radially towards or away from the bit aperture, and tightening the set wheel knob;

wherein the set wheel roller is positioned to press against the inner motion transfer roller such that when the inner motion transfer roller turns in the second rotational direction then the set wheel roller turns in the first rotational direction.

12. The hole saw dust collection device according to claim 11 wherein the set wheel roller contacts the outer hole cutter such that rotation of the set wheel roller in the first rotational direction forces motion of the outer hole cutter in the first rotational direction.

13. The hole saw dust collection device according to claim 12 wherein the hand crank handle is detachably coupled to the hex shank of the inner hole cutter;

wherein the hand crank handle is operable to apply the external rotational force to the hex shank of the inner hole cutter.

* * * * *